(12) United States Patent
Kondapalli

(10) Patent No.: US 8,855,127 B2
(45) Date of Patent: Oct. 7, 2014

(54) METHOD AND SYSTEM FOR INTELLIGENT DEEP PACKET BUFFERING

(71) Applicant: LSI Corporation, Milpitas, CA (US)

(72) Inventor: Raghu Kondapalli, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 137 days.

(21) Appl. No.: 13/633,211

(22) Filed: Oct. 2, 2012

(65) Prior Publication Data

US 2014/0092914 A1  Apr. 3, 2014

(51) Int. Cl.
*H04L 12/28* (2006.01)
*H04L 12/56* (2006.01)
*H04L 1/00* (2006.01)

(52) U.S. Cl.
USPC ............ 370/412; 370/230; 370/235; 370/389

(58) Field of Classification Search
USPC ......................................................... 370/412
See application file for complete search history.

(56) References Cited

U.S. PATENT DOCUMENTS

| | | | |
|---|---|---|---|
| 2002/0027916 A1* | 3/2002 | Kalkunte et al. | 370/392 |
| 2002/0110120 A1* | 8/2002 | Hagglund et al. | 370/389 |
| 2002/0141412 A1* | 10/2002 | Wong et al. | 370/392 |
| 2003/0058793 A1* | 3/2003 | Rochon et al. | 370/229 |
| 2003/0081624 A1* | 5/2003 | Aggarwal et al. | 370/412 |
| 2003/0147385 A1* | 8/2003 | Montalvo et al. | 370/389 |
| 2003/0174699 A1* | 9/2003 | Van Asten et al. | 370/389 |
| 2003/0189924 A1* | 10/2003 | Kadambi et al. | 370/360 |
| 2004/0037278 A1* | 2/2004 | Wong et al. | 370/389 |
| 2004/0264374 A1* | 12/2004 | Yu et al. | 370/230 |
| 2005/0047411 A1* | 3/2005 | Kadambi et al. | 370/389 |
| 2005/0073956 A1* | 4/2005 | Moores et al. | 370/235 |
| 2005/0089054 A1* | 4/2005 | Ciancaglini et al. | 370/412 |
| 2005/0135355 A1* | 6/2005 | Muthukrishnan et al. | 370/389 |
| 2005/0138238 A1* | 6/2005 | Tierney et al. | 710/33 |
| 2005/0207436 A1* | 9/2005 | Varma | 370/412 |
| 2006/0007937 A1* | 1/2006 | Sharma | 370/395.21 |
| 2006/0050738 A1* | 3/2006 | Carr et al. | 370/474 |
| 2006/0143334 A1* | 6/2006 | Naik | 710/56 |
| 2006/0187832 A1* | 8/2006 | Yu | 370/229 |
| 2006/0187839 A1* | 8/2006 | Smith et al. | 370/235 |
| 2007/0011396 A1* | 1/2007 | Singh et al. | 711/105 |
| 2007/0153697 A1* | 7/2007 | Kwan et al. | 370/235 |
| 2007/0195773 A1* | 8/2007 | Tatar et al. | 370/392 |
| 2008/0170571 A1* | 7/2008 | Kumar et al. | 370/392 |
| 2008/0273545 A1* | 11/2008 | Sgouros et al. | 370/412 |
| 2008/0279207 A1* | 11/2008 | Jones | 370/412 |
| 2009/0092046 A1* | 4/2009 | Naven et al. | 370/230 |
| 2009/0175286 A1* | 7/2009 | Naven et al. | 370/412 |
| 2010/0054268 A1* | 3/2010 | Divivier | 370/412 |
| 2010/0172264 A1* | 7/2010 | Jones | 370/252 |
| 2011/0064084 A1* | 3/2011 | Tatar et al. | 370/392 |
| 2012/0057460 A1* | 3/2012 | Hussain et al. | 370/235 |
| 2012/0106562 A1* | 5/2012 | Laor et al. | 370/401 |
| 2012/0195192 A1* | 8/2012 | Matthews et al. | 370/230 |

\* cited by examiner

*Primary Examiner* — Ian N Moore
*Assistant Examiner* — Jenee Williams

(57) ABSTRACT

Disclosed is a method and system for deep packet buffering on a switch core comprising an ingress and egress deep packet buffer and an external deep packet buffer.

2 Claims, 3 Drawing Sheets

METHOD AND SYSTEM FOR INTELLIGENT DEEP PACKET BUFFERING

BACKGROUND OF THE INVENTION

There are many platforms in the Ethernet industry that interconnect interfaces. At times, these interfaces may offer differing levels of performance. Typically, momentary bandwidth reductions need to be absorbed by the Ethernet backhaul network infrastructure element and ensure that no packets are lost in the process. For such scenarios, the Ethernet switch core that is part of the backhaul network platform will do deep packet buffering of frames.

SUMMARY OF THE INVENTION

An embodiment of the invention may therefore comprise a method for providing deep packet buffering for an Ethernet switch core comprising at least one policy engine, the method comprising sending incoming frames to an on-chip buffer and an at least one deep packet buffer, determining a policy for at least one frame of data via the policy engine, and if the at least one frame is destined to a port that is having a bandwidth variance, transferring the at least one frame from the at least one deep packet buffer to an external deep packet buffer.

An embodiment of the invention may therefore comprise a method of deep packet buffering in an Ethernet switch core, the core comprising an ingress policy engine, an egress policy engine, an ingress deep packet buffer and an egress deep packet buffer, the method comprising determining, by one of the policy engines, whether a frame is destined to or coming from a port that has a bandwidth variance and if the port has a bandwidth variance, transferring the frame to one of the deep packet buffers.

An embodiment of the invention may therefore comprise a system for providing deep packet buffering for an Ethernet switch core, the system comprising a switch core comprising an on-chip packet buffer, a media access controller, an ingress deep packet buffer, an egress deep packet buffer, an ingress policy engine, an egress policy engine and an external deep packet buffer, wherein the ingress policy engine is enabled to detect if the ports from which a frame is incoming are having a bandwidth variance, the egress policy engine is enabled to detect if the ports to which a frame is destined are having a bandwidth variance, a frame from the ingress deep packet buffer is transferred to the external deep packet buffer if the frame is destined to only ports with a bandwidth variance, a frame from the ingress deep packet buffer is discarded if the frame is destined to ports which do not have a bandwidth variance, and a frame from the ingress deep packet buffer is transferred to the external packet buffer and the frame is retained in the on-chip buffer.

DETAILED DESCRIPTION OF THE EMBODIMENTS

Figure 1:
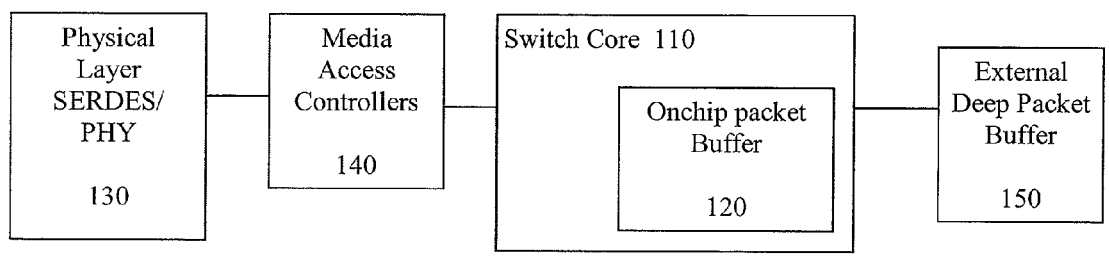
FIG. 1 is a switch core sub-system.

The Open Systems Interconnection (OSI) model is a product of the Open Systems Interconnection effort at the International Organization for Standardization. There are typically seven communication layers, labeled 1 to 7, in a communications system. Each layer is typically known as an N layer. At each level, two entities (N-entity peers) interact by means of the N protocol by transmitting protocol data units (PDU).

Layer 1 is the physical layer which defines electrical and physical specifications for devices. The implementation of this layer is often termed PHY. This layer defines the relationship between a device and a transmission medium, such as a copper or fiber optical cable. This includes the layout of pins, voltages, cable specifications, hubs, repeaters, network adapters, host bus adapters (H BA used in storage area networks) and more. Major functions and services performed by the physical layer are: establishment and termination of a connection to a communications medium; participation in the process whereby the communication resources are effectively shared among multiple users, e.g. contention resolution and flow control; and modulation or conversion between the representation of digital data in user equipment and the corresponding signals transmitted over a communications channel, i.e. such as signals operating over the physical cabling or over a radio link.

Layer 2 is the data link layer. The data link layer provides the functional and procedural means to transfer data between network entities and to detect and possibly correct errors that may occur in the physical layer. This layer may be intended for point-to-point and point-to-multipoint media, characteristic of wide area media in the telephone system. Local area network architecture, which included broadcast-capable multi-access media, was developed independently of the ISO work. Typically, only error detection, not flow control using sliding window, is present in data link protocols such as Point-to-Point Protocol (PPP), and, on local area networks. Connection-oriented WAN data link protocols, in addition to framing, detect and may correct errors. They are also capable of controlling the rate of transmission. A WAN data link layer might implement a sliding window flow control and acknowledgment mechanism to provide reliable delivery of frames.

The data link layer is the protocol layer that transfers data between adjacent network nodes in a WAN or between nodes on the same LAN segment. The data link layer provides the functional and procedural means to transfer data between network entities and might provide the means to detect and possibly correct errors that may occur in the physical layer. An example of data link protocols is Ethernet for LANs. The data link layer is concerned with local delivery of frames between devices on the same LAN.

Layer 3 is the network layer. The network layer provides the functional and procedural means of transferring variable length data sequences from a source host on one network to a destination host on a different network, while maintaining the quality of service requested by the transport layer. The network layer performs network routing functions, and might also perform fragmentation and reassembly, and report delivery errors. Routers operate at this layer, sending data throughout the extended network and making the Internet possible. The network layer may be divided into three sub-layers: sub-network access (considers protocols that deal with the interface to networks); sub-network-dependent convergence; and sub-network-independent convergence.

Layer 4 is the transport layer. The transport layer provides transparent transfer of data between end users, providing reliable data transfer services to the upper layers. The transport layer controls the reliability of a given link through flow control, segmentation/desegmentation, and error control. Some protocols are state- and connection-oriented. This means that the transport layer can keep track of the segments and retransmit those that fail. The transport layer also provides the acknowledgement of the successful data transmission and sends the next data if no errors occurred.

Layer 5 is the session layer. The session layer controls the dialogues (connections) between computers. It establishes, manages and terminates the connections between the local and remote application. It provides for full-duplex, half-duplex or simplex operation, and establishes check-pointing, adjournment, termination, and restart procedures. The OSI model made this layer responsible for graceful close of sessions, which is a property of TCP, and also for session check-pointing and recovery, which is not always used in IP. The session layer is commonly implemented explicitly in application environments that use remote procedure calls.

Layer 6 is the presentation layer. The presentation layer establishes context between application-layer entities, in which the higher layer entities may use different syntax and semantics if the presentation service provides a mapping between them. If a mapping is available, presentation service data units are encapsulated into session protocol data units, and passed down the stack. This layer provides independence from data representation (e.g. encryption) by translating between application and network formats. The presentation layer transforms data into the form that the application accepts. This layer formats and encrypts data to be sent across a network. It is sometimes called the syntax layer.

Layer 7 is the application layer. The application layer is the OSI layer closest to the end user, which means that both the OSI application layer and the user interact directly with the software application. This layer interacts with software applications that implement a communicating component. Application-layer functions typically include identifying communication partners, determining resource availability, and synchronizing communication. When identifying communication partners, the application layer determines the identity and availability of communication partners for an application with data to transmit. When determining resource availability, the application layer must decide whether sufficient network or the requested communications exist. In synchronizing communication, all communication between applications requires cooperation that is managed by the application layer.

Of the layers in an OSI communication system, layers 1-3 are media layers and layers 4-7 are host layers.

In an embodiment of the invention, a method and apparatus for enhancing an Ethernet switch core is provided to enhance the capabilities to perform deep packet buffering of incoming packets from 3 enabled interfaces on the device. There are many platforms in the Ethernet industry that interconnect interfaces.

For example, Ethernet is used as an interconnect into a Microwave backhaul infrastructure element where its primary function is to backhaul aggregated content data over microwave onto an Edge/core network infrastructure element. A core network is a central part of a telecommunication network that provides various services to customers who are connected by the access network. An Edge network is a digital mobile phone technology that allows improved data transmission rates as a backward-compatible extension of GSM. The backhaul portion of a network comprises the intermediate links between the edge/core network, or backbone network, and the small sub-networks at the "edge" of the entire hierarchical network.

It is understood that a Microwave link may inherently have dependency on weather conditions and the bandwidth variance across the microwave link may be quite significant. A momentary bandwidth reduction needs to be absorbed by the Ethernet backhaul network infrastructure element and ensure that no packets are lost. The Ethernet switch core that is part of the backhaul network platform needs to do deep packet buffering of frames. There are many instances where network platforms bandwidth variance causes Ethernet switch devices to perform deep packet buffering on the incoming frames to absorb such bandwidth variances and reduce packet losses.

Typical Ethernet switch silicon devices used in Enterprise, Campus and Data Center networks offer a silicon integrated packet memory buffer to be able to absorb enough of incoming packets to keep up with the wire speed switching operation. Wire speed is a non-formal language term referring to the hypothetical peak physical layer net bitrate (useful information rate) of a cable (consisting of fiber-optical wires or copper wires) combined with a certain digital communication device/interface/port. The wire speed of fast Ethernet is 100 Mbits/sec, also known as the peak bitrate, connection speed, useful bit rate, information rate, or digital bandwidth capacity. The wire speed is the data transfer rate that a telecommunications standard provides at a reference point between the physical layer and the data link layer. The operations performed in a typical switch core consist of packet parsing, access control list lookups, forwarding lookups, packet header manipulations, queuing and traffic management. Accordingly, the incoming frames get stored in an on-chip packet memory while the packet processing steps described above are performed in the frame. This is typically on the order of a few Megabytes of packet memory that gets integrated into the Ethernet switch silicon. As is known, systems communicating over Ethernet divide a stream of data into shorter pieces called frames. Each frame contains source and destination addresses and error-checking data so that damaged data can be detected and re-transmitted. As per the OSI model, Ethernet provides services up to and including the data link layer—layer 2.

The typical integrated switch core packet buffer may be sufficient for platforms that do not deal with uplink or downlink bandwidth variances. There are many industry network platforms that do deal with significant bandwidth variances. The bandwidth variances need to be absorbed and the switch core interfaces that do not have any momentary bandwidth variance need to not be affected.

The Ethernet switch cores' support for deep packet buffering is essential for the platforms which have significant momentary bandwidth variances due to weather, air interfaces, etc. It is also essential for those platforms for which standard Ethernet flow control cannot be used to pause off the traffic. An example of this is the Ethernet Backhaul equipment used in mobile infrastructures.

An embodiment of the invention improves existing standard pipelined switch architectures to be able to have typically smaller on-chip packet buffers and extend this architecture to be able to utilize larger memory systems (typically using external DRAM type memories) which support several hundreds of milliseconds of packet buffering.

As noted above, Ethernet switches typically operate at Layer 2 of the OSI stack and interface with a Media Access Controller (MAC) on one side which in turn is connected to a physical layer component, such as a SERDES or a copper PHY. Media access control (MAC data communication protocol is a sublayer of the data link layer. The MAC sublayer provides addressing and channel access control mechanisms that make it possible for several terminals or network modes to communicate within a multiple access network that incorporates a shared medium, e.g. Ethernet. The hardware that implements the MAC is referred to as a medium access controller.

FIG. 1 is a switch core sub-system. A switch core 110 contains an on-chip packet buffer 120. The switch core 110 communicates with a physical layer SERDES/PHY 130 via a Media Access Controller 140 and also with an External Deep Packet Buffer 150.

Figure 2:
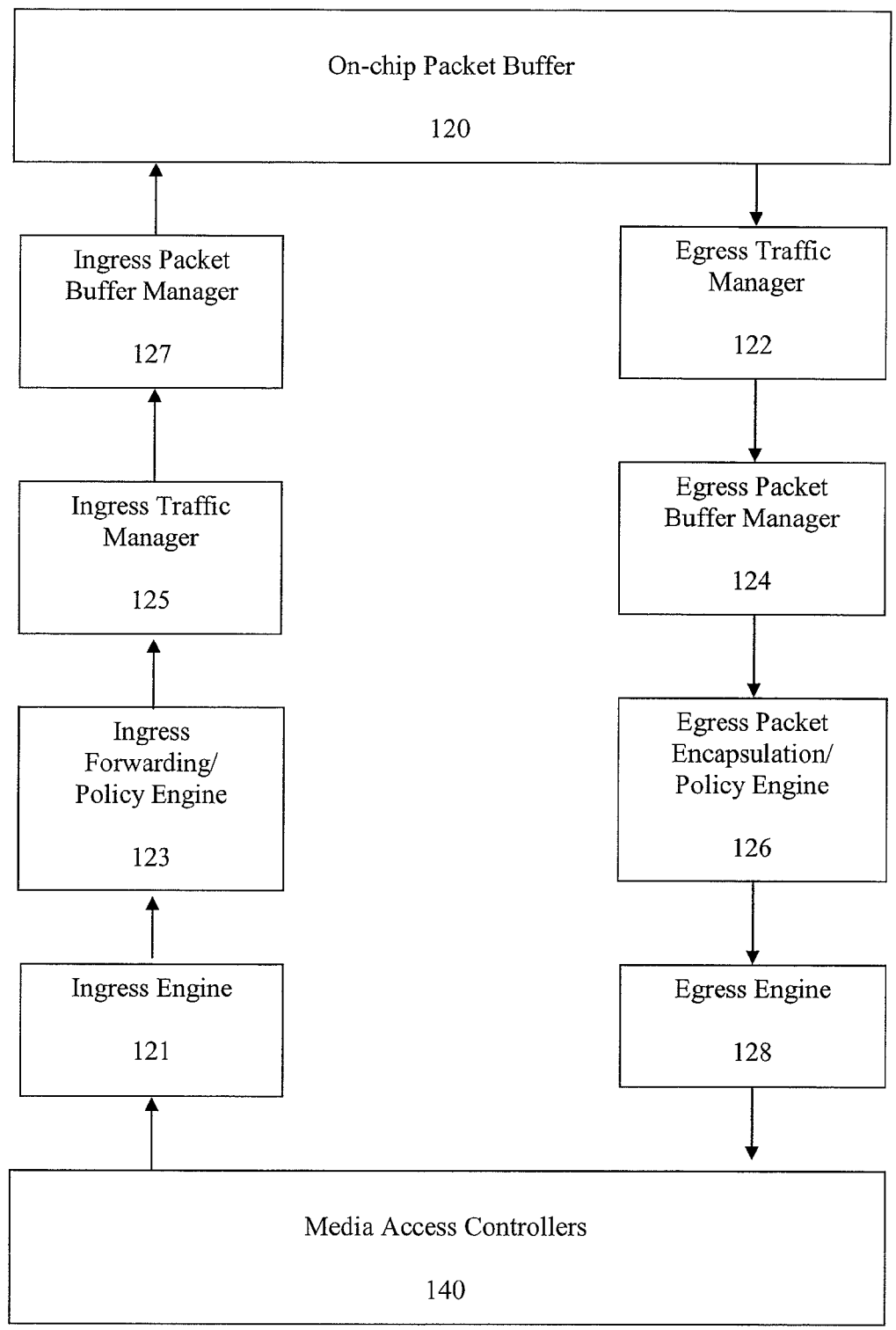
FIG. 2 is a traditional switch core pipeline.

FIG. 2 is a traditional switch core pipeline. FIG. 2 shows the various pipeline states and the use of the on-chip packet buffer. Data from the on-chip buffer 120 is serially handled by an egress traffic manager 122, an egress packet buffer manager 124 and egress packet encapsulation/policy engine 126 and an egress engine 128 before it arrives at the MAC 140. Data from the MAC 140 is serially handled by an ingress engine 121, an ingress forwarding/policy engine 123, an ingress traffic manager 125 and an ingress packet buffer manager 127 before it arrives at the on-chip packet buffer. It is possible that an addition of multiple external memory interfaces to the switch silicon could possibly add deep packet buffering to the traditional switch core. It is understood that such an addition would substantially increase the silicon cost and end platform cost.

Figure 3:
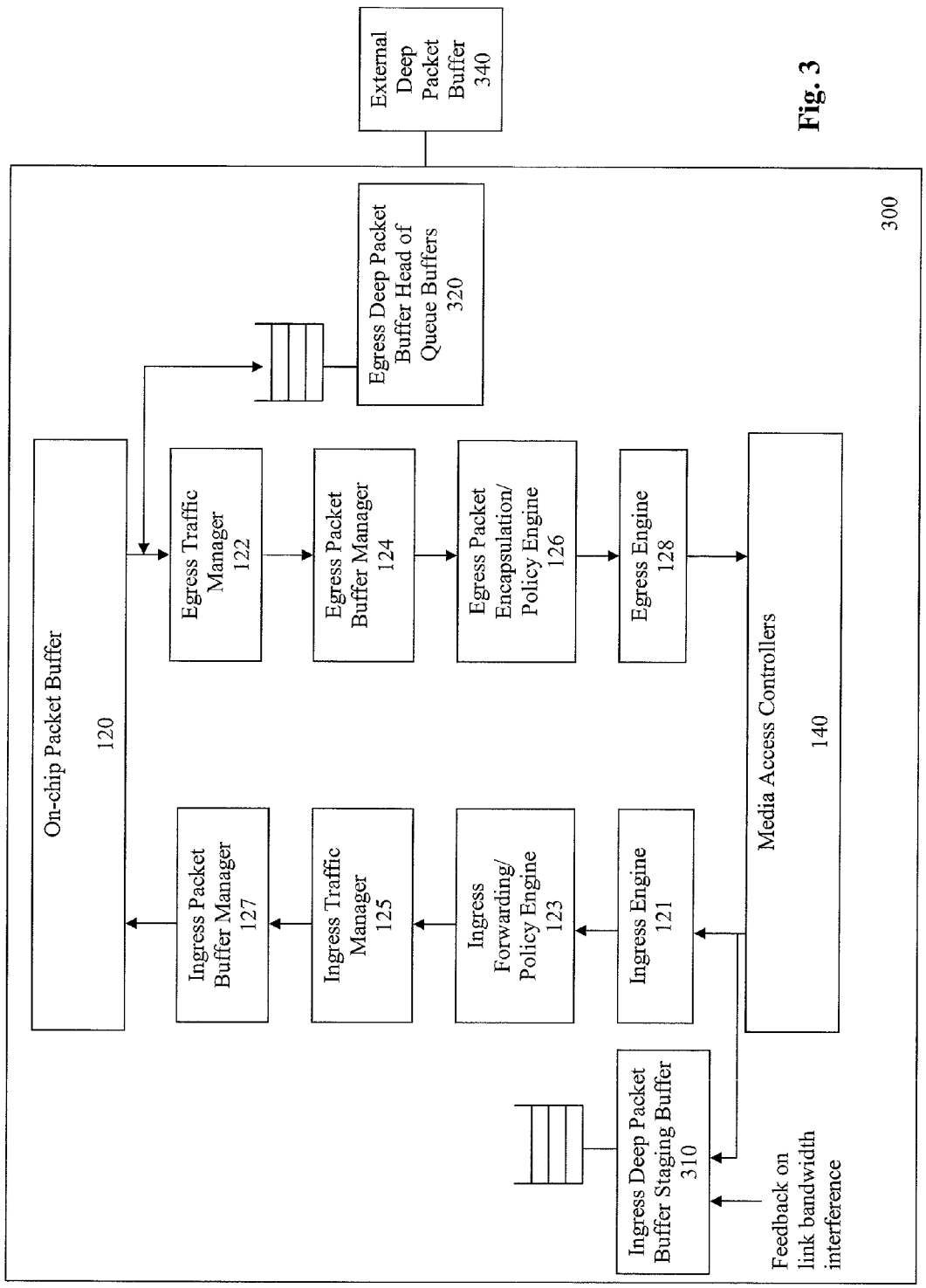
FIG. 3 is a switch core with deep packet buffering.

FIG. 3 is a switch core with deep packet buffering. The FIG. 3 identifies same elements as FIG. 2. An on-chip buffer 120 communicates serially with an egress traffic manager 122, an egress packet buffer manager 124 an egress packet encapsulation/policy engine 126 and an egress engine 128 and then to the MAC 140. However, prior to communication with the egress traffic manager 122, the on-chip packet buffer may communicate with a queue 320, an egress deep packet buffer head of queue buffers. Likewise, on communications from the MAC 140 to the on-chip packet buffer 120, the MAC may communicate with an ingress deep packet buffer staging buffer 310.

As shown in FIG. 3, this embodiment of the invention provides deep packet buffering for network environments that have momentary bandwidth fluctuations. The method and system shown intelligently use the external deep packet buffer only for traffic that is interfacing the fluctuating network bandwidth ports. For example, in Ethernet Microwave Backhaul use type situation, the ports interfacing the microwave side are the only ones that will be allowed to use the external packet buffer. This limitation allows a silicon subsystem to be able to limit the number of external memory interfaces needed to support the deep packet buffering.

As shown in FIG. 3, the egress 320 and ingress 310 queues are components to an existing switch architecture allowing for lossless operation in longer periods of uncertain bandwidths. On the ingress side of FIG. 3, where in ingress queue 310 is situated, the incoming frames will get stored in the on-chip buffer 120 and the incoming frames will go into both the ingress deep packet buffer 310 and also the on-chip packet buffer 120. As the incoming frame goes through the ingress forwarding/policy engine 123, the engine 123 determines the handling of the frame. The frame may only be destined to the ports that are momentarily throttled because of a bandwidth variance, or the frame may be destined to a port or ports that are not momentarily throttled, or the frame may be destined to a port or ports that are both throttled and non-throttled. Accordingly, there are three different determinations that can be made for frames on the ingress portion of FIG. 3.

In the case (first case) where the frame is destined to the ports what are momentarily throttled, the frame from the ingress deep packet buffer will get transferred to the external deep packet buffer 340. In the case (second case) where the frame is destined to a port or ports that are not momentarily throttled, the frame from the ingress deep packet buffer will be discarded and regular on-chip buffer entry will be used to perform normal switch pipeline processing of the frame. Note that the frame is handled in a normal fashion and is only discarded from the ingress deep packet buffer 310. In the case (third case) where the frame is destined to a port or ports that are both throttled and non-throttled, the frame from the ingress deep packet buffer 310 will be transferred to the external packet buffer and the frame is also retained in the on-chip packet buffer 120.

Very similar handling of frames will occur on the egress portion of FIG. 3. In the case where a frame is only destined to the ports that are momentarily throttled, the frame will be transferred to the deep packet buffer. In the case where a frame is destined to a port or ports that are not momentarily throttled, the frame from the egress deep packet buffer will be discarded and regular on-chip buffer entry is used for normal switch pipeline processing. As for the case where a frame is destined to a port or ports that are both throttled and non-throttled, when the packet is sent out to all ports that are not throttled, the on-chip packet buffer 120 will get reclaimed into the a free buffer pool.

As noted, frames will be sent to the external deep packet buffer 340 from the ingress deep packet buffer 310 and egress deep packet buffer 320 in the cases where the frames are destined to ports that are both throttled and non-throttled. The egress engine 126 will read packet headers and payloads for the first few packets within all the queues that are supported by the external deep packet buffer 340. The read packet headers and payloads will be stored in an on-chip memory (not shown).

In an embodiment of the invention, the egress pipeline starts with a hierarchical scheduler deciding the specific output port and specific class and queue that needs to be selected based on various bandwidth and link state information. The scheduler needs the packet length of the head of the queue information for it to decide on the next port class queue. The scheduler checks if the on-chip deep packet buffer head queues have any data along with on-chip packet queues head of queue lengths.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for providing deep packet buffering for an Ethernet switch core comprising at least one policy engine, said method comprising:
    sending incoming frames to an on-chip buffer and an at least one deep packet buffer,
    determining a policy for at least one frame of data via the policy engine; and
    if the at least one frame is destined to a port that is having a bandwidth variance, transferring the at least one frame from the at least one deep packet buffer to an external deep packet buffer;
    if the at least one frame is destined to a port that is not having a bandwidth variance, discarding the at least one frame from the deep packet buffer and utilizing the on-chip buffer for switch pipeline processing; and
    if the at least one frame is destined to a plurality of ports, said plurality of ports having a subset which has a bandwidth variance and a subset which does not have a bandwidth variance, transferring the at least one frame from one of said at least one deep packet buffer to an the external packet buffer, retaining the at least one frame in the on-chip buffer, sending a frame to a subset of ports that do not have a bandwidth variance and reclaiming the frame from the on-chip packet buffer.

2. The method of claim 1, further comprising reading packet headers and payload information for all frames sent to the external deep packet buffer and storing the packet header and payload information in an on-chip memory.

* * * * *